US009297676B2

(12) United States Patent
Kato

(10) Patent No.: US 9,297,676 B2
(45) Date of Patent: Mar. 29, 2016

(54) ERROR FREQUENCY COMPONENT ACQUISITION DEVICE, ANGLE OF ROTATION ACQUISITION DEVICE, MOTOR CONTROL DEVICE, AND ANGLE OF ROTATION ACQUISITION METHOD

(75) Inventor: Yoshiki Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 2 days.

(21) Appl. No.: 14/342,847

(22) PCT Filed: Sep. 5, 2012

(86) PCT No.: PCT/JP2012/072595
§ 371 (c)(1),
(2), (4) Date: Apr. 16, 2014

(87) PCT Pub. No.: WO2013/035735
PCT Pub. Date: Mar. 14, 2013

(65) Prior Publication Data
US 2014/0300306 A1    Oct. 9, 2014

(30) Foreign Application Priority Data

Sep. 8, 2011    (JP) .................................. 2011-196005

(51) Int. Cl.
*H02P 6/00*    (2006.01)
*G01D 18/00*    (2006.01)
(Continued)

(52) U.S. Cl.
CPC .................. *G01D 18/00* (2013.01); *G01D 5/12* (2013.01); *G01D 5/208* (2013.01); *G01D 5/2073* (2013.01); *G01D 5/24476* (2013.01); *H02K 11/001* (2013.01); *H02P 6/06* (2013.01)

(58) Field of Classification Search
CPC ... H02P 1/00; H02P 2101/00; H02P 2203/00; H02K 1/00; H02K 2201/00; H02K 2203/00
See application file for complete search history.

(56) References Cited

U.S. PATENT DOCUMENTS

| 5,305,241 A | 4/1994 | Hayashi et al. |
| 2008/0111516 A1* | 5/2008 | Inokuma ................. H02P 21/14 318/799 |

(Continued)

FOREIGN PATENT DOCUMENTS

| CN | 101932914 | 12/2010 |
| EP | 2 209 213 A2 | 7/2010 |

(Continued)

OTHER PUBLICATIONS

International Search Report issued Oct. 9, 2012 in International (PCT) Application No. PCT/JP2012/072595 with English translation.

(Continued)

*Primary Examiner* — Shawki S Ismail
*Assistant Examiner* — Zoheb Imtiaz
(74) *Attorney, Agent, or Firm* — Wenderoth, Lind & Ponack, L.L.P.

(57) ABSTRACT

In a device in which the rotation angle of the rotor is detected with a resolver, the rotation angle of the rotor with less error can be obtained while reducing burden of the operator. The measured angle value acquisition unit acquires the measured-rotation angle value of a motor shaft. The error calculation unit calculates the error included in each of measured-rotation angle values. The frequency component acquisition unit determines the phase and the amplitude of a frequency component of the error based on the errors. Thus, by using the error frequency component acquisition device, the phase and amplitude of the frequency component of the error included in the measured-rotation angle value can be automatically calculated and the correction with respect to the measure-rotation angle value can be performed using the acquired phase and amplitude. Therefore, the rotation angle of the rotor with less error can be obtained, while reducing the burden of the operator.

5 Claims, 13 Drawing Sheets

(51) Int. Cl.
*G01D 5/20* (2006.01)
*G01D 5/12* (2006.01)
*H02K 11/00* (2006.01)
*G01D 5/244* (2006.01)
*H02P 6/06* (2006.01)

(56) References Cited

U.S. PATENT DOCUMENTS

2009/0167296 A1* 7/2009 Yokokawa ........... G01D 5/2073
324/207.25
2011/0134984 A1 6/2011 Seo

FOREIGN PATENT DOCUMENTS

| FR | 2 955 388 | 7/2011 |
|----|-----------|--------|
| JP | 4-125409 | 4/1992 |
| JP | 2007-198942 | 8/2007 |
| JP | 2007-292653 | 11/2007 |
| JP | 2009-156852 | 7/2009 |
| JP | 2009-244115 | 10/2009 |
| JP | 2010-164426 | 7/2010 |

OTHER PUBLICATIONS

Written Opinion of the International Searching Authority issued Oct. 9, 2012 in International (PCT) Application No. PCT/JP2012/072595 with English translation.

Chinese Office Action dated Jul. 31, 2015 in corresponding Chinese Patent Application No. 201280054229.2 (with partial translation of Search Report).

Notice of Reasons for Rejection issued Apr. 7, 2015 in corresponding Japanese Application No. 2011-196005 with English translation.

Extended European Search Report issued Apr. 8, 2015 in corresponding European Application No. 12830756.8.

* cited by examiner

FIG. 11

| | | | DETECTED ANGLE AT TIME $t_1$ | | CALCULATRED ANGLE AT TIME $t_1$ : $x_1=at_1+b$ | | ERROR AT TIME $t_1$ : $e_1=y_1-x_1$ |
|---|---|---|---|---|---|---|---|
| $t_1$ | 1ST SAMPLING TIME | $y_1$ | | $x_1$ | | $e_1$ | |
| $t_2$ | 2ND SAMPLING TIME | $y_2$ | DETECTED ANGLE AT TIME $t_2$ | $x_2$ | CALCULATRED ANGLE AT TIME $t_2$ : $x_2=at_2+b$ | $e_2$ | ERROR AT TIME $t_2$ : $e_2=y_2-x_2$ |
| ... | | ... | | ... | | ... | |
| $t_{n-1}$ | (n-1)-TH SAMPLING TIME | $y_{n-1}$ | DETECTED ANGLE AT TIME $t_{n-1}$ | $x_{n-1}$ | CALCULATRED ANGLE AT TIME $t_{n-1}$ : $x_{n-1}=at_{n-1}+b$ | $e_{n-1}$ | ERROR AT TIME $t_{n-1}$ : $e_{n-1}=y_{n-1}-x_{n-1}$ |
| $t_n$ | n-TH SAMPLING TIME | $y_n$ | DETECTED ANGLE AT TIME $t_n$ | $x_n$ | CALCULATRED ANGLE AT TIME $t_n$ : $x_n=at_n+b$ | $e_n$ | ERROR AT TIME $t_n$ : $e_n=y_n-x_n$ |

FIG. 12

| $X_1$ | 0° | $E_1$ | ANGLE ERROR AT 0° |
|---|---|---|---|
| $X_2$ | 0°+ANGLE SPACING $\Delta X$ | $E_2$ | ANGLE ERROR AT (0°+ANGLE SPACING $\Delta X$) |
| | | | |
| $\vdots$ | | $\vdots$ | |
| | | | |
| $X_{N-1}$ | 360°−2∗ANGLE SPACING $\Delta X$ | $E_{N-1}$ | ANGLE ERROR AT (360°−2∗ANGLE SPACING $\Delta X$) |
| $X_N$ | 360°−ANGLE SPACING $\Delta X$ | $E_N$ | ANGLE ERROR AT (360°−ANGLE SPACING $\Delta X$) |

ERROR FREQUENCY COMPONENT ACQUISITION DEVICE, ANGLE OF ROTATION ACQUISITION DEVICE, MOTOR CONTROL DEVICE, AND ANGLE OF ROTATION ACQUISITION METHOD

TECHNICAL FIELD

The present invention relates to an error frequency component acquisition device, a rotation angle acquisition device, a motor control device, and a rotation angle acquisition method.

Priority is claimed on Japanese Patent Application No. 2011-196005, filed Sep. 8, 2011, the content of which is incorporated herein by reference.

BACKGROUND ART

As a method to detect the rotation angle of the rotor (motor shaft) of a motor, the method using the resolver is known. The resolver is a rotation detecting device detecting the rotation angle of the rotor based on the phase difference between the rotor coil and the stator coil. For example, a resolver includes: an excitation coil; a resolver rotor rotating with the motor shaft; and a detection coil. When, alternating current is applied to the excitation coil, electrical voltage whose amplitude corresponds to the rotation angle of the resolver rotor is generated in the detection coil. As such, based on the amplitude of the electrical voltage generated in the detection coil, the rotation angle of the rotor (the rotation angle of the resolver rotor, which is the rotation angle of the motor shaft) can be detected.

During detection of the rotation angle of the rotor with the resolver, error occurs depending on the mounting position of the resolver or the like. Several methods are proposed in order to correct the error (reduce the extent of the error).

For example, there is a method in which an error map corresponding to the rotation angle of the rotor to be detected by the resolver is generated in advance and the error is corrected by using the error map. The error map can be generated by performing the error-deriving operation relative to multiple rotation angles of the rotor. In the error-acquiring operation, the rotor is set to a certain specific angle, and difference between the set rotation angle (real rotation angle) and the rotation angle detected by the resolver.

Also, a rotation angle detection device is proposed in Patent Literature 1 (PTL 1). This rotation angle detection device disclosed in PTL 1 includes: a resolver that detect the rotation angle of the rotor of the motor to output a rotation angle signal; a rotation angle calculation unit that calculates the rotation angle of the rotor based on the rotation angle signal; EEPROM that has stored the offset angle and the amplitude of the higher-order sine wave components included in the errors of the rotation angles in advance; a higher-order sine wave component calculating unit that calculates the multiple higher-order sine wave components based on the rotation angles, the offset angles, and the amplitudes; and a rotation angle correction unit that calculates the correcting rotation angle by subtracting the multiple higher-order sine wave components from the rotation angles.

Because of the configuration described above, the rotation angle can be detected highly accurately without including errors.

RELATED ART DOCUMENT

Patent Literature

PTL 1: Japanese Unexamined Patent Application, First Publication No. 2007-292653

SUMMARY OF THE INVENTION

Problems to be Solved by the Invention

In the method in which the rotation angle of the rotor detected by the resolver is corrected by using the error map, generation of the error map is essential. Generating the error map is burden for the operator (a person adjusting the rotation angle detecting device using the resolver). For example, the operator has to adjust the device in such a way that the rotor is in the specific rotation angle in regard to each of the multiple rotation angles of the rotor. Also, the operator has to calculate the errors of the rotation angles of the rotor detected by the resolver in regard to the adjusted rotation angles of the rotor. Then, the error map is generated based on the calculated errors. Such a procedure is enormously cumbersome.

Also, in the case of the motor or the resolver being replaced due to malfunction or the like, the error map has to be generated from scratch again. Therefore, the method causes another burden for the operator in this aspect.

Also, in the rotation angle detection device disclosed in PTL 1, the offset angle and the amplitude of the higher-order sine wave components included in the errors of the rotation angles detected by the resolver have to be stored in EPROM (Electronically Erasable Programmable Read-Only Memory) in advance.

As a method for deriving the offset angles and the amplitudes, a method, in which the error of the rotation angle of the rotor detected by the resolver is calculated as in the case using the error map and the offset angles and amplitudes are determined from the obtained errors, can be taken into consideration. However, as in the above-described case, the operator has to adjust the device in such a way that the rotor is in the specific rotation angle in regard to each of the multiple rotation angles of the rotor. Also, the operator has to determine the errors of the rotation angles of the rotor detected by the resolver in regard to the adjusted rotation angles of the rotor. Then, the error map is generated based on the calculated errors. Furthermore, the operator has to determine the offset angles and the amplitudes from the calculated errors. Such requirements are enormously cumbersome for the operator.

Also, in the case of the motor or the resolver being replaced due to malfunction or the like, the offset angles and the amplitudes have to be acquired again. Therefore, the device causes another burden for the operator in this aspect.

The present invention is made under the circumstances explained above. The purpose of the present invention is to provide an error frequency component acquisition device, a rotation angle acquisition device, a motor control device, and a rotation angle acquisition method, which allow obtaining less error while reducing burden of the operator.

Means for Solving the Problems

The present invention is made in order to solve the problems explained above, and has aspects shown below.

(1) An error frequency component acquisition device including:

a measured angle value acquisition unit configured to acquire a measured-rotation angle value of a motor shaft;

an error calculation unit configured to calculate an error included in each of a plurality of measured-rotation angle values acquired by the measured angle value acquisition unit; and a frequency component acquisition unit configured to determine a phase and an amplitude of a frequency component of the error based on a plurality of errors calculated by the error calculation unit.

(2) The error frequency component acquisition device according to (1) described above, wherein the frequency component acquisition unit includes:

an evenly spacing unit configured to acquire an error of each of a plurality of rotation angles being set up in an equal spacing based on the plurality of errors calculated by the error calculation unit; and a Fourier series acquisition unit configured to determine the phase and the amplitude of the frequency component of the error by acquiring a Fourier series fitting to the error of the each of a plurality of rotation angles being set up in an equal spacing obtained by the evenly spacing unit.

(3) The error frequency component acquisition device according to (1) or (2) described above, wherein the frequency component acquisition unit determines the phase and amplitude of a fundamental component of the error and a second harmonic component of the error based on a plurality of the errors calculated by the error calculation unit.

(4) The error frequency component acquisition device according to any one of (1) to (3) described above, wherein the error calculation unit includes:

a continuity-forming unit configured to form continuity at a switching point of the rotation angles of a plurality of the measured-rotation angle values acquired by the measured angle value acquisition unit to convert the plurality of the measured-rotation angle values to continuity-formed measured-rotation angle values;

a reference data acquisition unit configured to acquire a rotation-angle reference data, in which the error included in the each of the plurality of the continuity-formed measured-rotation angle values generated by the continuity-forming unit is reduced; and a subtraction unit configured to subtract the rotation-angle reference data acquired by the reference data acquisition unit from the each of the plurality of the measured-rotation angle values acquired by the measured angle value acquisition unit.

(5) A rotation angle acquisition device including:

the error frequency component acquisition device according to any one of (1) to (4) described above; and a rotation angle correction unit configured to perform correction to reduce an error with respect to the measured-rotation angle value of the motor shaft based on the phase and the amplitude of the frequency component of the error acquired by the error frequency component acquisition device.

(6) A motor control device including the rotation angle acquisition device according to (5) described above.

(7) A rotation angle acquisition method including the steps of:

acquiring a measured-rotation angle value;

calculating an error included in each of a plurality of measured-rotation angle values acquired in the step of acquiring a measured-rotation angle value;

acquiring a phase and an amplitude of a frequency component of the error based on a plurality of errors calculated in the step of calculating an error; and performing correction to reduce an error with respect to the measured-rotation angle value of the motor shaft based on the phase and the amplitude of the frequency component of the error acquired in the step of acquiring a phase and an amplitude of a frequency component.

Effects of the Invention

According to the present invention, the rotation angle of the rotor with less error can be obtained while reducing burden of the operator.

BRIEF DESCRIPTION OF THE DRAWINGS

FIG. 11 is a drawing showing an example of errors calculated by the subtraction unit 223 in the above-described embodiment.

FIG. 12 is a drawing showing an example of errors acquired by the evenly spacing unit 231 in the above-described embodiment.

DETAILED DESCRIPTION OF THE INVENTION

Embodiments of the present invention are explained in reference to drawings below.

First, the general operation of the motor control device is explained. The motor control device controls a motor by receiving electricity from a battery cell in industrial vehicles, electric vehicles, hybrid vehicles, railroads, ships, airplanes, power generation systems, or the like, for example.

In the electric vehicle, which is powered by an electric motor, and the hybrid vehicle, which is powered by an internal combustion engine and an electric motor (hereinafter referred as "electric vehicle or the like"), a pulse width modulation (PWM: Pulse Width Modulation), which modulates the pulse when the motor control device controls the 3-phase driving electrical power, is used in order to improve the electrical power utilization efficiency.

Mainly, the permanent magnet synchronous motor is used for the electric vehicle or the like. In such a motor, 3-phase current synchronizing to the rotation is applied. In order to perform PWM control on the 3-phase current, an electrical pulse with a constant frequency, which is called the carrier signal, is used. In this case, the driving electrical power is supplied to the motor in a form of a rectangular wave whose pulse width is modulated to be matched to the timing of the carrier signal and is transformed to 3-phase current in the sine wave by the inductance of the motor.

Then, the motor control device configured as described above performs PI (Proportional Integral) control, in which the current flowing in the motor is adjusted, in such a way that the torque corresponding to the input torque command to be obtained, for example. At that time, the motor control device performs PI control in 2-phase of d-axis and q-axis by performing coordinate transformation on the 3-phase supplied to the motor into 2-axis coordinate of d-axis and q-axis.

Figure 1:
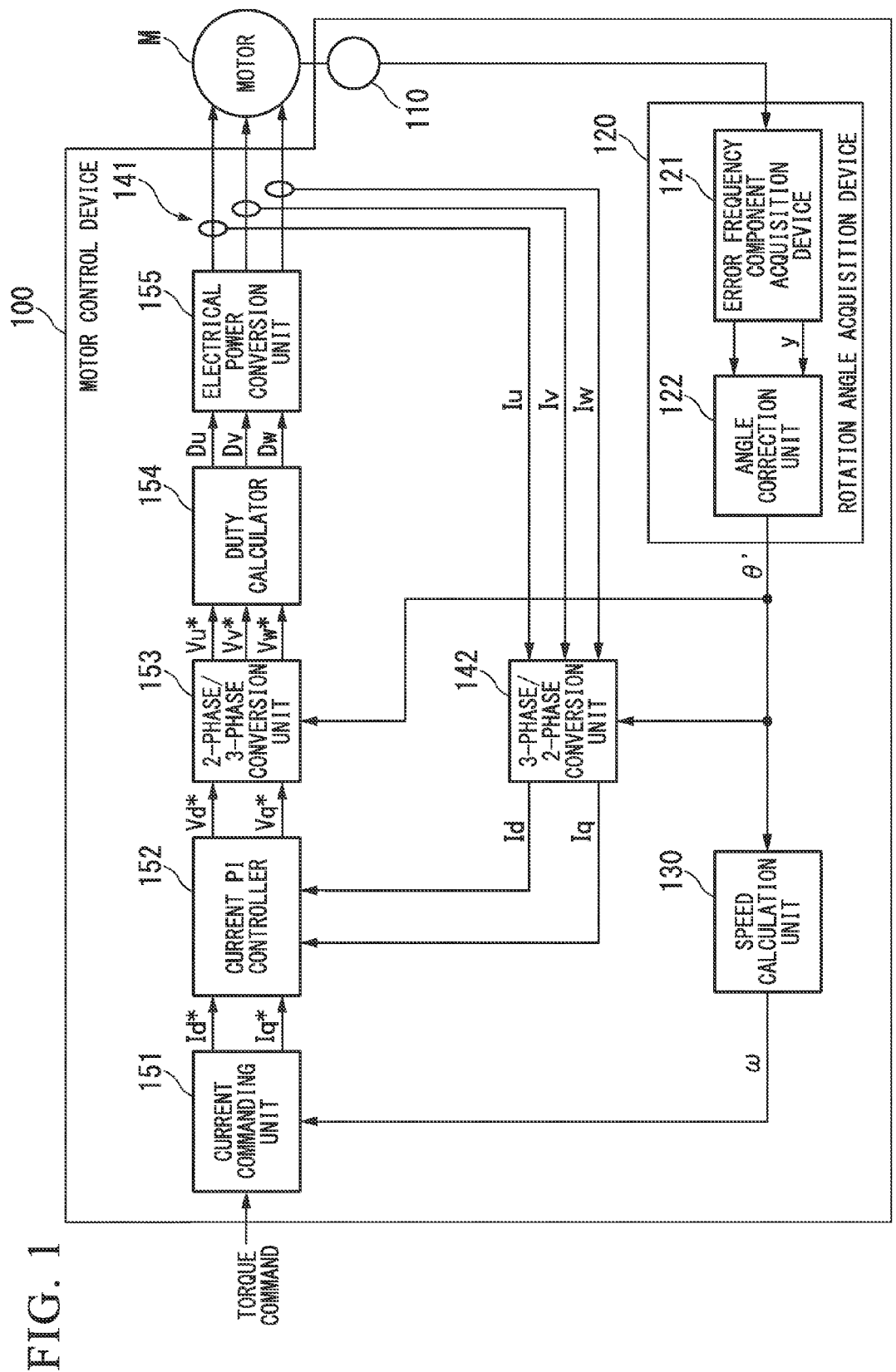
FIG. 1 is a schematic block diagram illustrating a functional configuration of the motor control device of an embodiment of the present invention.

FIG. 1 is a schematic block diagram illustrating a functional configuration of the motor control device of an embodiment of the present invention. In FIG. 1, the motor control device 100 includes: the resolver 110; the rotation angle acquisition device 120; the speed calculation unit 130; the current detector 141; the 3-phase/2-phase conversion unit 142; the current commanding unit 151; the current PI controller 152; the 2-phase/3-phase conversion unit 153; the duty calculator 154; and the electrical power conversion unit 155. The rotation angle acquisition device 120 includes: the error frequency component acquisition device 121; and the angle correction unit 122. Also, the motor control device 100 controls the motor M.

The motor M is a 3-phase motor driven by the electrical driven power output from the electrical power conversion unit 155. The resolver 110 is attached to the motor M.

The resolver 110 is a rotation detection device detecting the rotation angle of the rotor of the motor M. The resolve 110 outputs the signal (resolver-detected signal, which is explained later) indicating the rotation angle of the rotor to the rotation angle acquisition device 120. The detailed configuration of the resolver 110 is explained later.

The rotation angle acquisition device 120 converts the resolver-detected signal, which is output from the resolver 110, to the measured-rotation angle value y. Then, the rotation angle acquisition device 120 calculates the post-correction rotation angle $\theta'$ in which the error is reduced and outputs the obtained post-correction rotation angle $\theta'$ to: the speed calculation unit 130; the 3-phase/2-phase conversion unit 142; and the 2-phase/3-phase conversion unit 153.

The error frequency component acquisition device 121 converts the resolver-detected signal, which is output from the resolver 110, to the measured-rotation angle value y. Then, the error frequency component acquisition device 121 determines the phase and amplitude of the frequency component of the error included in the measured-rotation angle value y.

The error frequency component acquisition device 121 determines the phase and amplitude of the frequency component of the error as a pre-processing for the angle correction unit 122 to perform correction to the measured-rotation angle value y. Then, the error frequency component acquisition device 121 outputs the phase and amplitude of the frequency component of the error to the angle correction unit 122 and the measured-rotation angle value y to the angle correction unit 122 in order. The more detailed configuration of the error frequency component acquisition device 121 is explained later.

The angle correction unit 122 performs correction to reduce the error included in the measured-rotation angle value y, which is output from the error frequency component acquisition device 121, based on the phase and amplitude of the frequency component of the error, the phase and the amplitude being output from the error frequency component acquisition device 121. Then, the angle correction unit 122 outputs the obtained post-correction rotation angle $\theta'$ to the speed calculation unit 130, the 3-phase/2-phase conversion unit 142, and the 2-phase/3-phase conversion unit 153.

The speed calculation unit 130 calculates the angular velocity $\omega$ of the rotor of the motor M from the post-correction rotation angle $\theta'$, which is output from the angle correction unit 122. Then, the speed calculation unit 130 outputs the obtained angular velocity $\omega$ to the current commanding unit 151.

The current detector 141 detects the 3-phase current values, Iu, Iv, and Iw to the motor M, and outputs to the 3-phase/2-phase conversion unit 142.

The 3-phase/2-phase conversion unit 142 converts the 3-phase current values, Iu, Iv, and Iw, which are output from the current detector 141, to 2-phase current values, Id, which is the current value of the d-axis component, and Iq, which is the current value of the q-axis component (hereinafter, they are referred as "detected current values"). The 3-phase/2-phase conversion unit 142 outputs the obtained detected current values, Id and Iq to the current PI controller 152.

The d-axis and the q-axis are the coordinate axes set to the motor shaft. The d-axis is set to the direction of the flux generated by the magnetic pole. The q-axis is set to the orthogonal direction to the d-axis electronically and magnetically. The current of the d-axis component (d-axis current) is the component that is used for making the motor M generate the flux (excitation current component). The current of the q-axis component (q-axis current) is the component corresponding to the torque of the load.

Hereinafter, the command value and the command signal are indicated by variables suffixed by the "*" on the upper right.

When it is an automobile, the torque command associated with the opening of the throttle pedal or the like and the angular velocity $\omega$, which is output from the speed calculation unit 130, are input to the current commanding unit 151. The torque command is for commanding the torque for the motor to generate. The current commanding unit 151 generates the 2-phase current values, Id* and Iq* with the d- and q-axes components (hereinafter referred as "command current values") as the command values of the currents corresponding to the torque command value and the angular velocity $\omega$. The current commanding unit 151 outputs the generated command current values to the current PI controller 152.

The current PI controller 152 controls the current values, Iu, Iv, and Iw flowing in the motor M in such a way that, regarding that the detected current values, Id and Iq which are output from the 3-phase/2-phase conversion unit 142 are the control variables, the detected current values, Id and Iq, become the values corresponding to the command current values, Id* and Iq*, which are output from the current commanding unit 151.

The current PI controller 152 calculates the deviation ΔId and the ΔIq by subtracting the detected current values, Id and Iq, from the command current values, Id* and Iq*, respectively. Then, the current PI controller 152 calculates the command voltage Vd* of the d-axis using the calculated deviation ΔId based on the formula (1) below.

$$Vd^* = Kp \times \Delta Id + Ki \times \int (\Delta Id) dt \quad \text{[Formula 1]}$$

The coefficients Kp and Ki are the coefficients set in advance.

Also, the current PI controller 152 calculates the command voltage Vq* of the q-axis using the calculated deviation ΔIq based on the formula (2) below.

$$Vq^* = Kp \times \Delta Iq + Ki \times \int (\Delta Iq) dt \quad \text{[Formula 2]}$$

The 2-phase/3-phase conversion unit 153 calculates the 3-phase command voltage values, Vu*, Vv*, and Vw*, by using the post-correction rotation angle θ', which is output from the rotation angle acquisition device 120 and coordinate transforming the command voltage values, Vd* and Vq*, which are output from the current PI controller 152. The 2-phase/3-phase conversion unit 153 outputs the calculated 3-phase command voltage values, Vu*, Vv*, and Vw*, to the duty calculator 154.

The duty calculator 154 calculates the duty signals, Du, Dv, and Dw, which indicate the electric driving current signals given to the motor from the 3-phase command voltage values, Vu*, Vv*, and Vw*, in the timing set by the carrier frequency fc. The duty calculator 154 outputs the calculated duty signals, Du, Dv, and Dw, to the electrical power conversion unit 155.

The electrical power conversion unit 155 includes the power control element (power element) such as IGBT (Insulated Gate Bipolar Transistor) and generates the electrical driving current (motor driving current) corresponding to the duty signal. The electrical power conversion unit 155 generates the 3-phase electrical driving current corresponding to the duty signals, Du, Dv, and Dw, which are output from the duty calculator 154, and supplies the generated 3-phase electrical driving current to the motor M.

Figure 2:
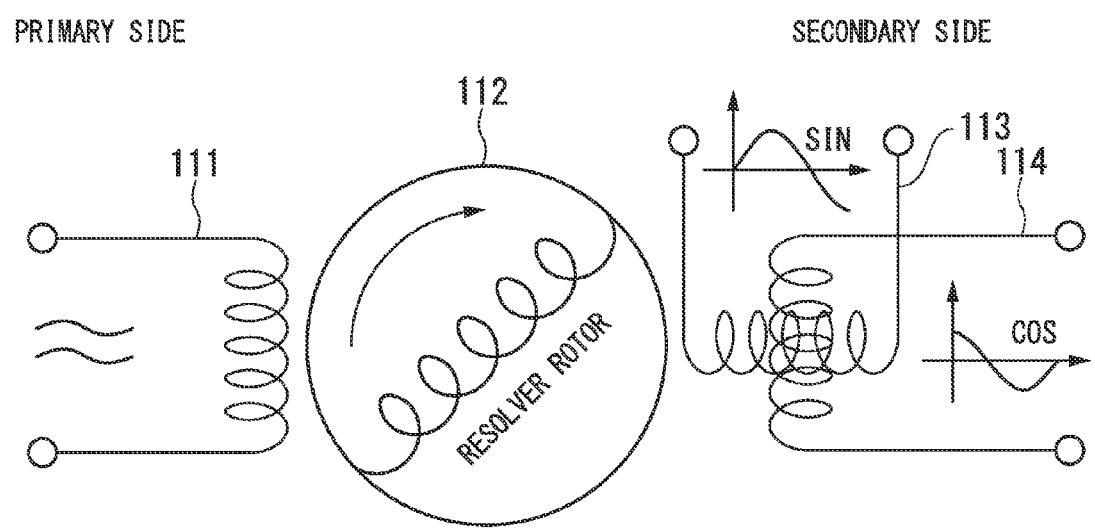
FIG. 2 is a configuration diagram illustrating a schematic configuration of the resolver 110 in the above-mentioned embodiment.

FIG. 2 is a configuration diagram illustrating a schematic configuration of the resolver 110. The resolver 110 includes: the primary side coil (excitation coil) 111 to which alternating-current (AC) voltage (excitation voltage) is applied; the resolver rotor 112, which is provided to the rotor of the motor M and rotates with the rotor of the motor M; and the two secondary side coils (detection coils) with 90° phase each other, one of which is the sine signal detection coil 113 and another of which is the cosine signal detection coil 114, in FIG. 2.

When AC voltage is applied to the primary side coil 111, voltage is generated to the sine signal detection coil 113 and the cosine signal detection coil 114. The amplitude of the current generated in the sine signal detection coil 113 and the cosine signal detection coil 114 changes in accordance with the rotation angle of the resolver rotor 112 (that is the rotation angle of the rotor of the motor M). Specifically, assuming the rotation angle of the resolver rotor as θ, the voltage of the amplitude sin θ is generated to the sine signal detection coil 113, and the voltage of the amplitude cos θ is generated to the cosine signal detection coil 114.

Hereinafter, the voltage generated in the sine signal detection coil 113 and the cosine signal detection coil 114 are referred as "resolver-detected signal."

Figure 3:
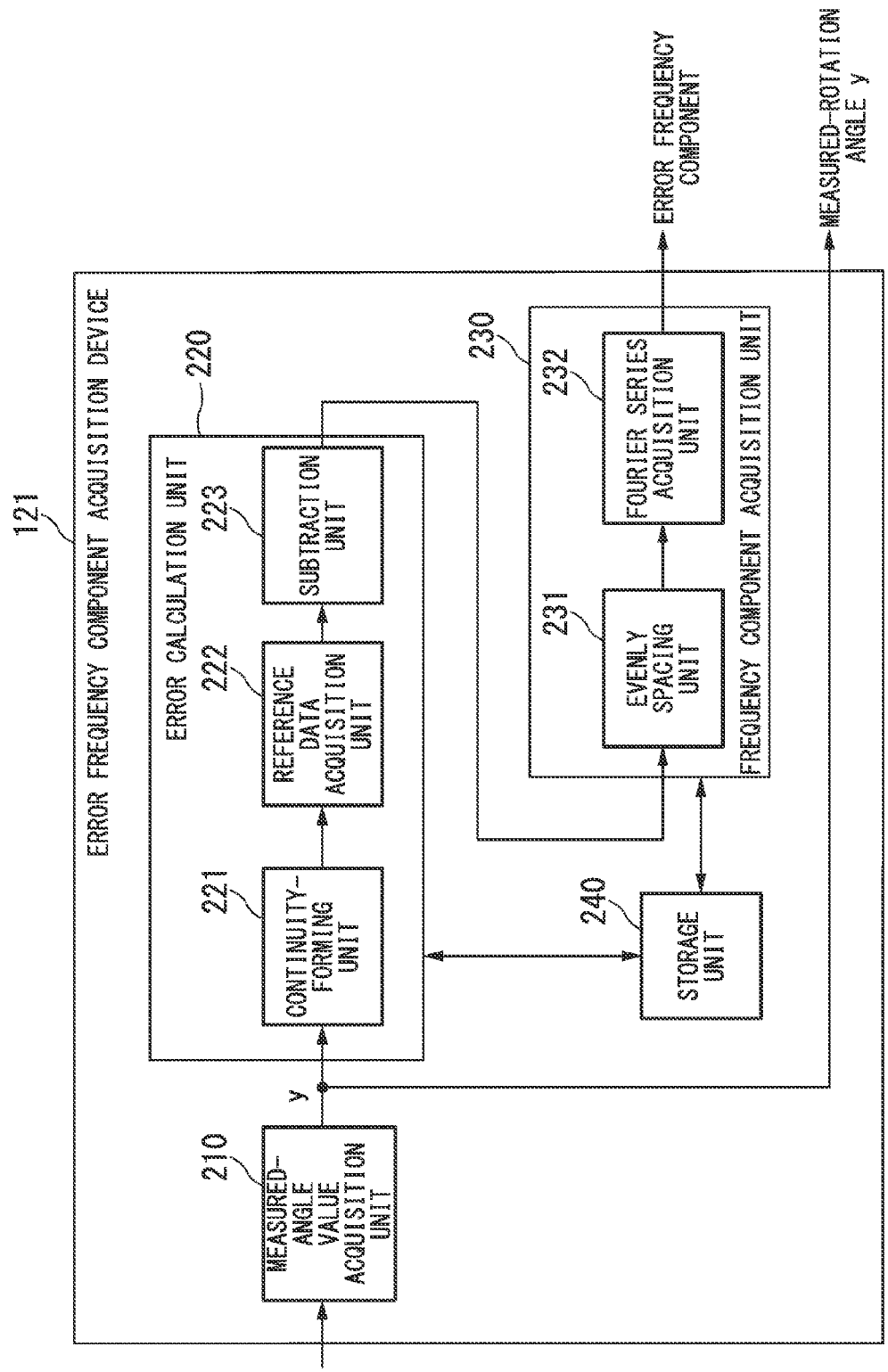
FIG. 3 is a schematic block diagram illustrating a functional configuration of the error frequency component acquisition device 121 of the above-mentioned embodiment.

FIG. 3 is a schematic block diagram illustrating a functional configuration of the error frequency component acquisition device 121. The error frequency component acquisition device 121 includes: the measured-rotation angle value acquisition unit 210; the error calculation unit 220; the frequency component acquisition unit 230; and the storage unit 240, in FIG. 3. The error calculation unit 220 includes: the continuity-forming unit 221; the reference data acquisition unit 222; and the subtraction unit 223. The frequency component acquisition unit 230 includes: the evenly spacing unit 231; and the Fourier series acquisition unit 232.

The storage unit 240 stores data calculated by each part of the error calculation unit 220 and the frequency component acquisition unit 230. Also, the storage unit 240 becomes the working memory during processing by the each part.

The measured-rotation angle value acquisition unit 210 is an R/D converter (resolver-digital converter). The measured-rotation angle value acquisition unit 210 acquires the measured-rotation angle value y of the motor shaft by converting the resolver-detected signal, which is output from the resolver 110, to the measure-rotation angle value y. The measured-rotation angle value acquisition unit 210 converts the resolver-detected signal to the measured-rotation angle value y in every predetermined sampling times and outputs the obtained measure-rotation angle value y to the error calculation unit 220 (the continuity-forming unit 221) and the angle correction unit 122 (FIG. 1) in order.

The error calculation unit 220 calculates the error included in each of the multiple measure-rotation angle values y (the measure-rotation angle value y in every sampling times) acquired by the measured-rotation angle value acquisition unit 210.

The continuity-forming unit 221 forms continuity at the switching point of the rotation angle within the multiple measured-rotation angle values y obtained by the measured-rotation angle value acquisition unit 210 to convert the multiple measured-rotation angle values y to the continuity-formed measured-rotation angle value. The switching point of the rotation angle is explained to reference to FIGS. 4 and 5.

Figure 4:
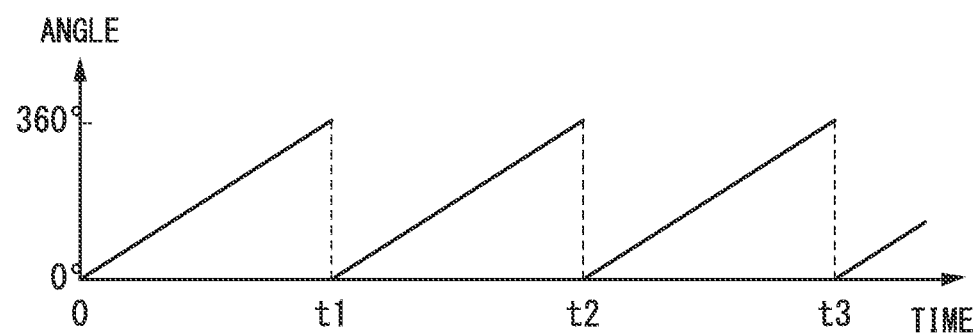
FIG. 4 is a graph showing an example indicating the rotation angle of the rotor (rotation angle of the rotor of the motor M) in the range from 0° or more to less than 360° in the above-mentioned embodiment.

FIG. 4 is a graph showing an example indicating the rotation angle of the rotor (rotation angle of the rotor of the motor M) in the range from 0° or more to less than 360°. In FIG. 4, the rotation angle of the rotor becomes gradually wider from 0° to 360°. For example, the rotation angle of the rotor becomes gradually wider from the time t1 to the time t2.

However, the graph of the rotation angle of the rotor becomes discontinuous since the rotation angle of the rotor is indicated as 0° when the rotation angle of the rotor reaches to 360°. Hereinafter, the points where the graph of the rotation angle of the rotor becomes discontinuous are referred as "switching point of the rotation angle" or simply "switching point." In other words, the switching point is the points where the rotor rotates once and the rotation angle becomes 0°. In the graph shown in FIG. 4, each of the times t1, t2, and t3 corresponds to the switching point.

In the graph shown in FIG. 4, an example, in which the rotational acceleration is low, is shown. Since the rotation speed of the rotor is almost consistent, the graph of the rotation angle of the rotor is in the straight-line sawtooth waveform.

Figure 5:
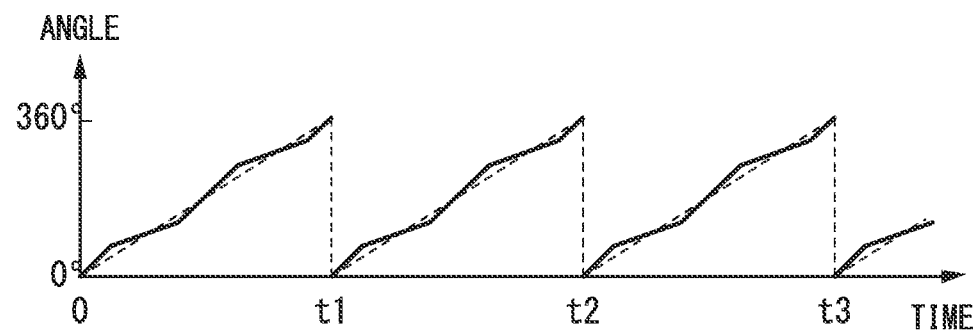
FIG. 5 is a graph showing an example indicating the rotation angle of the rotor detected by the resolver 110 in the above-described embodiment.

FIG. 5 is a graph showing an example indicating the rotation angle of the rotor detected by the resolver 110. In the FIG. 5, the resolver 110 detects the rotation angle of the rotor in the range from 0° to less than 360°. Thus, there are switching points in FIG. 5, as in the case shown in FIG. 4.

In addition, the rotation angle of the rotor detected by the resolver 110 includes errors. Thus, the graph shown in FIG. 5 is the wave form of the graph in which the errors are superimposed to the straight-line sawtooth waveform in the graph shown in FIG. 4.

The measure-rotation angle value y is the value indicating the rotation angle of the rotor detected by the resolver 110. Thus, there are points corresponding to the switching points in FIG. 5 in the series of the measured-rotation angle value y (multiple measured-rotation angle value), which is output from the measured-rotation angle value acquisition unit 210 in order. Hereinafter, the position corresponding to the switching point in FIG. 5 in the series of the measured-rotation angle value y is referred as "switching point of the rotation angle" in the multiple the measured-rotation angle values. This switching point in the multiple measured-rotation angle values appears as the position where the value in the series of the measured-rotation angle value y is significantly dropped.

As explained above, the switching point of the rotation angle is included in the series of the measured-rotation angle value y. In the section passing the switching point of the rotation angle of the rotor, it is impossible to perform properly the straight-line approximation in order to smooth the errors. On the other hand, it is preferable to perform the straight-line approximation to the section with a certain length (meaning enough sample number to some extent) in order to reduce the errors by performing the straight-line approximation to the series of the measured-rotation angle value y.

Therefore, the continuity-forming unit 221 forms continuity in the switching point of the rotation angle in the multiple measured-rotation angle values y to convert the multiple measured-rotation angle value y to the continuity-formed measured-rotation angle value.

Specifically, in the case that the measured-rotation angle value y, in the sampling number i (i is a positive integer) is smaller than the value obtained by subtracting 180° from the measured-rotation angle value one sampling number before $y_{i-1}$ (that is, $y_i < y_{i-1} - 180°$), the continuity-forming unit 221 subtracts 360° from the all of the measured-rotation angle values, $y_1, y_2, \ldots, y_{i-1}$, sample numbers of which are less than i.

Because of this, the measured-rotation angle value y is indicated as a value equals to −360° or more and less than 360°, and continuity is formed in the switching point of the rotation angle between the sampling number i−1 and the sampling number i.

Figure 6:
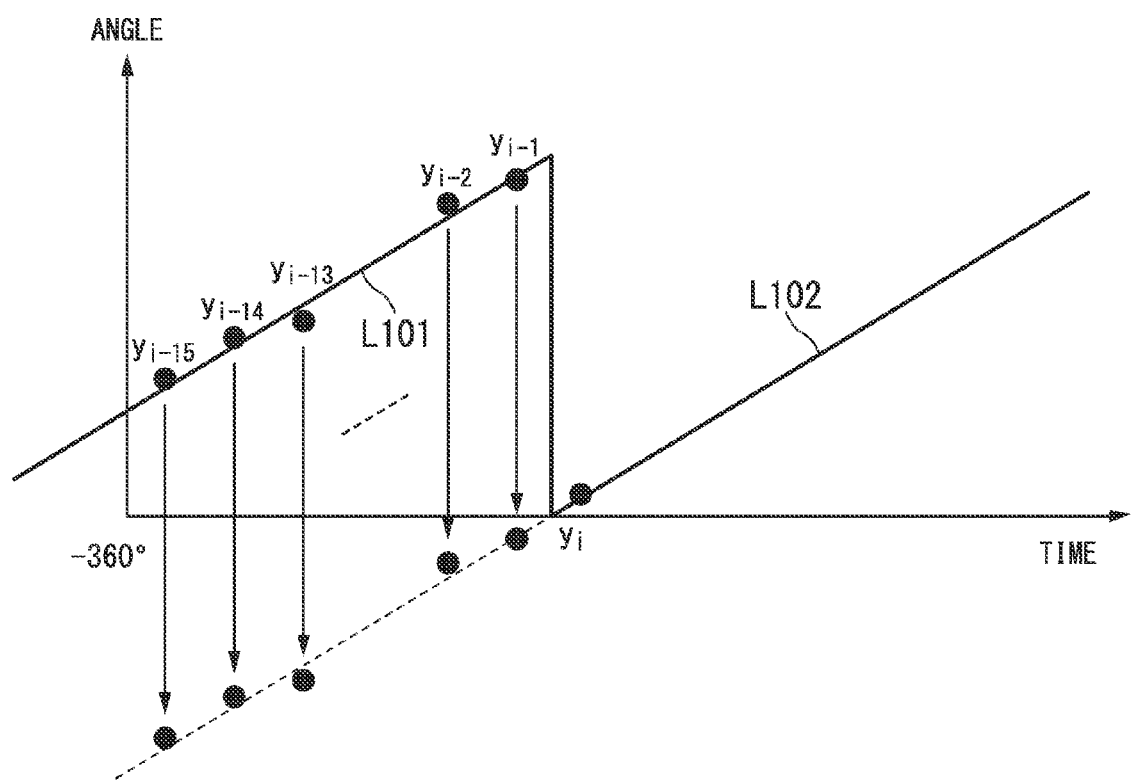
FIG. 6 is a graph showing an example in which 360° is subtracted from the measured-rotation angle value, sampling times of which is less than "i" in the above-described embodiment.

FIG. 6 is a graph showing an example in which 360° is subtracted from the measured-rotation angle value, sampling times of which is less than "i. In FIG. 6, each value located in the vicinity of the line L101 are converted to the values located in the vicinity of the line L102 by subtracting 360° from the measured-rotation angle values, $y_1, y_2, \ldots, y_{i-1}$, sample numbers of which are less than i.

Because of this, continuity is formed in the switching point of the rotation angle between the sampling number i−1 and the sampling number i. In other words, the situation, in which the value in the sampling number i with respect to the value in the sampling number i−1 is significantly reduced, is circumvented.

The continuity-forming unit 221 performs the above-described processing with regard to the all measured-rotation angle values y, which are output from the measured-rotation angle value acquisition unit 210. For example, in the case that n (n is a positive integer) of the measured-rotation angle values, $y_1, y_2, \ldots$, and $y_n$, are output from the measured-rotation angle value acquisition unit 210, the above-described processing is performed in the situations of i=1, 2, . . . n, in the order. By performing the processing, the continuity-forming unit 221 acquires the series of the continuity-formed measured-rotation angle value (that is, the series not including the switching point of the rotation angle) through the all sections.

Figure 7:
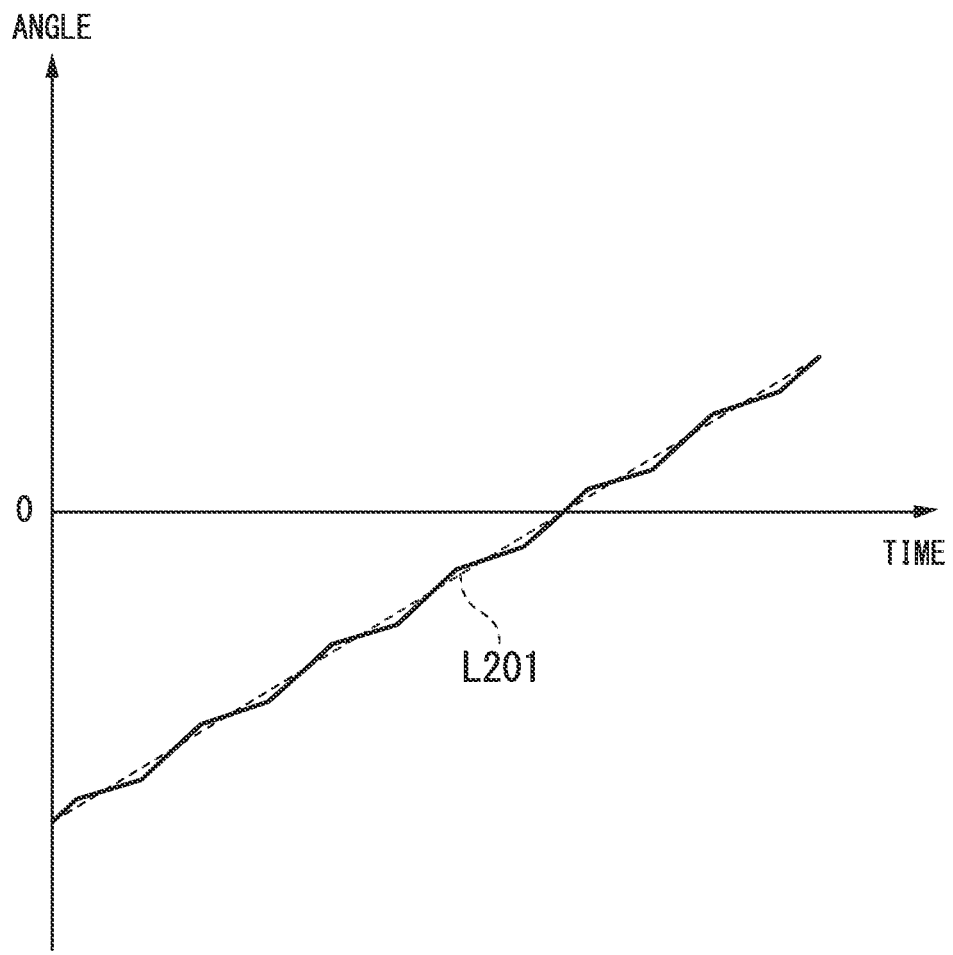
FIG. 7 is a graph showing an example of a series of the continuity-formed measured-rotation angle values through the all sections in the above-described embodiment.

FIG. 7 is a graph showing an example of the series of the continuity-formed measured-rotation angle values through the all sections. In FIG. 7, continuity is formed in the switching point of the rotation angle. Also, the continuity-formed measured-rotation angle values indicate the values in which the errors are superimposed to the rotation angles of the rotor indicated by the line L201. Therefore, it is possible to perform properly straight-line approximation to the continuity-formed measured-rotation angle values shown in FIG. 7.

In the case where the direction of the angles detected by the resolver 110 is opposite to the rotation direction of the rotor, the rotation angle of the rotor and the angle detected by the resolver 110 becomes the sawtooth waveform in which the value is gradually decreased in contrast to the graphs in FIGS. 4 and 5.

Thus, in the case that the measured-rotation angle value $y_i$ in the sampling number i (i is a positive integer) is larger than the value obtained by adding 180° to the measured-rotation angle value one sampling number before $y_{i-1}$ (that is, $y_i > y_{i-1} + 180°$), the continuity-forming unit 221 adds 360° to the all of the measured-rotation angle values, $y_1, y_2, \ldots, y_{i-1}$, sample numbers of which are less than i.

Because of this, the measured-rotation angle value is indicated as a value equals to 0° or more and less than 720°, and continuity is formed in the switching point of the rotation angle between the sampling number i−1 and the sampling number i.

Figure 8:
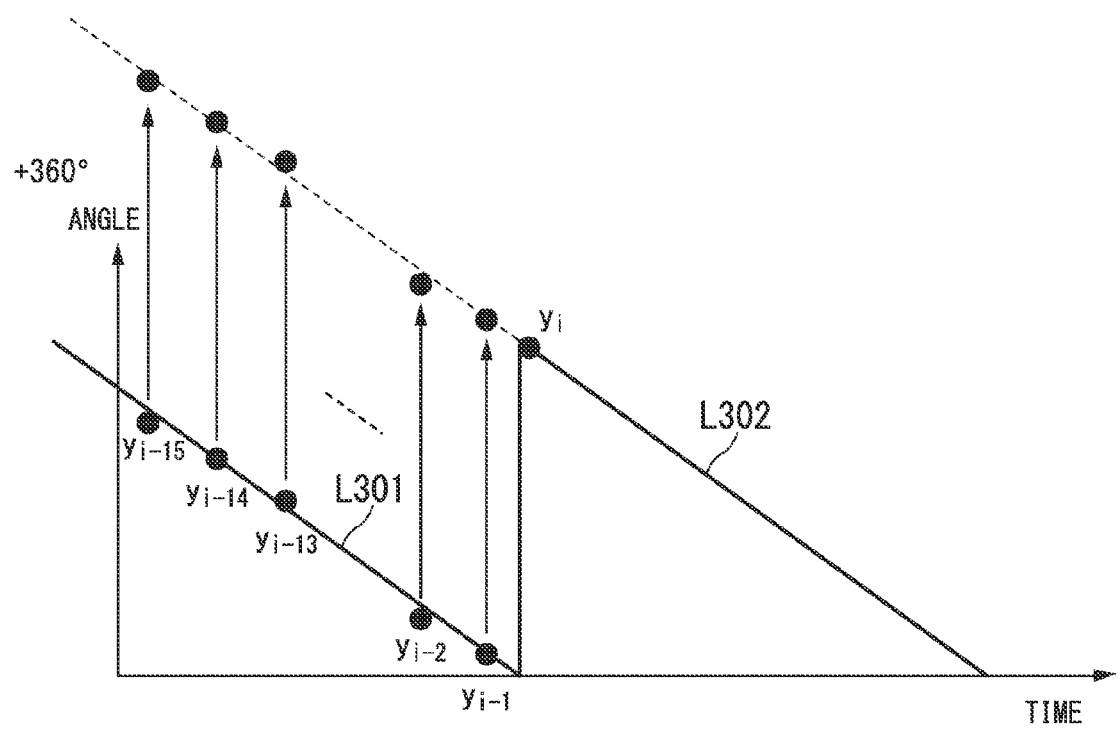
FIG. 8 is a graph showing an example in which 360° is added to the measured-rotation angle value, sampling times of which is less than in the above-described embodiment.

FIG. 8 is a graph showing an example in which 360° is added to the measured-rotation angle value, sampling times of which is less than "i." In FIG. 8, each value located in the vicinity of the line L301 are converted to the values located in the vicinity of the line L302 by adding 360° to the measured-rotation angle values, $y_1, y_2, \ldots, y_{i-1}$, sample numbers of which are less than i.

Because of this, continuity is formed in the switching point of the rotation angle between the sampling number i−1 and the sampling number i. In other words, the situation, in which the value in the sampling number i with respect to the value in the sampling number i−1 is significantly increased, is circumvented.

The processing performed by the continuity-forming unit 221 is not limited to the above-described processing as long as it is a processing capable of forming continuity in the series of the measured-rotation angle values including the switching point. For example, in the case that the measured-rotation angle value $y_i$ in the sampling number i (i is a positive integer) is smaller than the value obtained by subtracting 180° from the measured-rotation angle value one sampling number before (that is, $y_i < y_{i-1} - 180°$, instead of the continuity-forming unit 221 subtracting 360° from the all of the measured-rotation angle values, $y_1, y_2, \ldots, y_{i-1}$, sample numbers of which are less than i, it may add 360° to the all of the measured-rotation angle values, $y_{i+1}, y_{i+2}, \ldots, y_{i+n}$, sample numbers of which are more than i. Also, in the case that the measured-rotation angle value $y_i$ in the sampling number i (i is a positive integer) is larger than the value obtained by subtracting 180° to the measured-rotation angle value one sampling number before $y_{i-1}$, instead of the continuity-forming unit 221 adding 360° to the all of the measured-rotation angle values, $y_1, y_2, \ldots, y_{i-1}$, sample numbers of which are less than i, it may subtract 360° from the all of the measured-rotation angle values, $y_{i+1}, y_{i+2}, \ldots, y_{i+n}$, sample numbers of which are more than i.

The continuity-forming unit 221 writes the continuity-formed measured-rotation angle value to the storage unit 240, for example. Then, by outputting the signal indicating the completion of the processing to the reference data acquisition unit 222, the continuity-forming unit 221 passes over the continuity-formed measured-rotation angle value to the reference data acquisition unit 222.

The reference data acquisition unit 222 acquires the rotation angle reference data in which the errors included in each of the continuity-formed measured-rotation angle values generated by the continuity-forming unit 221 are reduced. Specifically, the reference data acquisition unit 222 acquires the rotation angle reference data by performing the straight-line approximation to the continuity-formed measured-rotation angle values. Performing the straight-line approximation is explained in reference to FIGS. 9 and 10.

Figure 9:
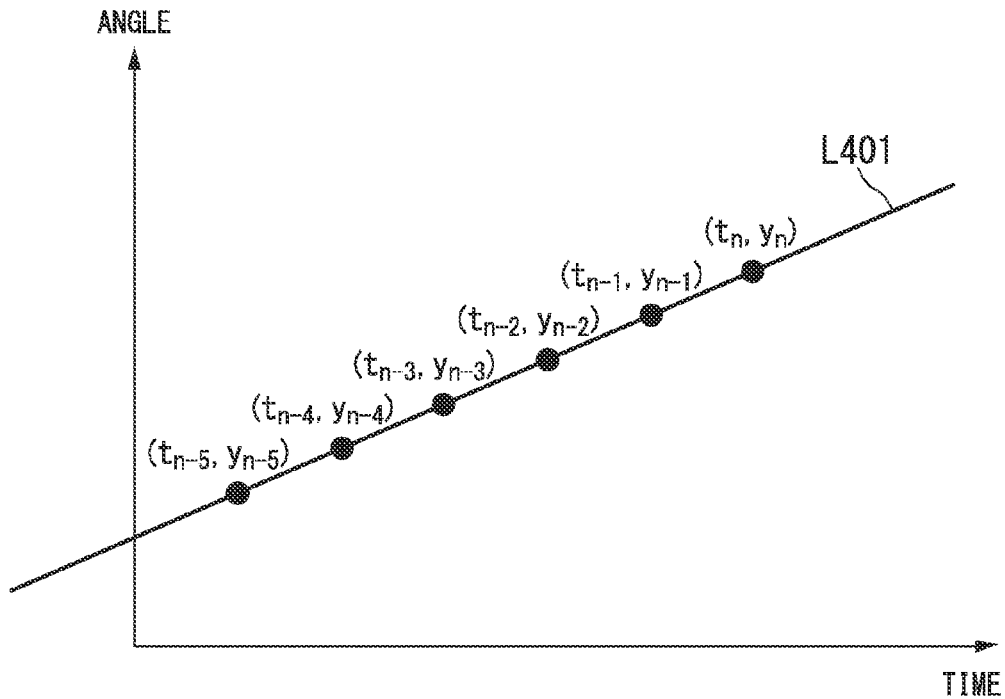
FIG. 9 is a graph showing an example of relationship between the rotation angle of the rotor and time in the above-described embodiment.

FIG. 9 is a graph showing an example of relationship between the rotation angle of the rotor and time. When the rotational acceleration of the rotor is low, the rotation angles of the rotor, in which continuity is formed in the switching points of the rotation angle, are indicated by the line L401 as in FIG. 9. Thus, if the continuity-formed measured-rotation angle values do not include the errors, they turn into the points, $(t_{n-5}, y_{n-5})$, $(t_{n-4}, y_{n-4})$, ..., and $(t_n, y_n)$.

The time $t_i$ indicates the time when the i-th sampling is performed.

Figure 10:
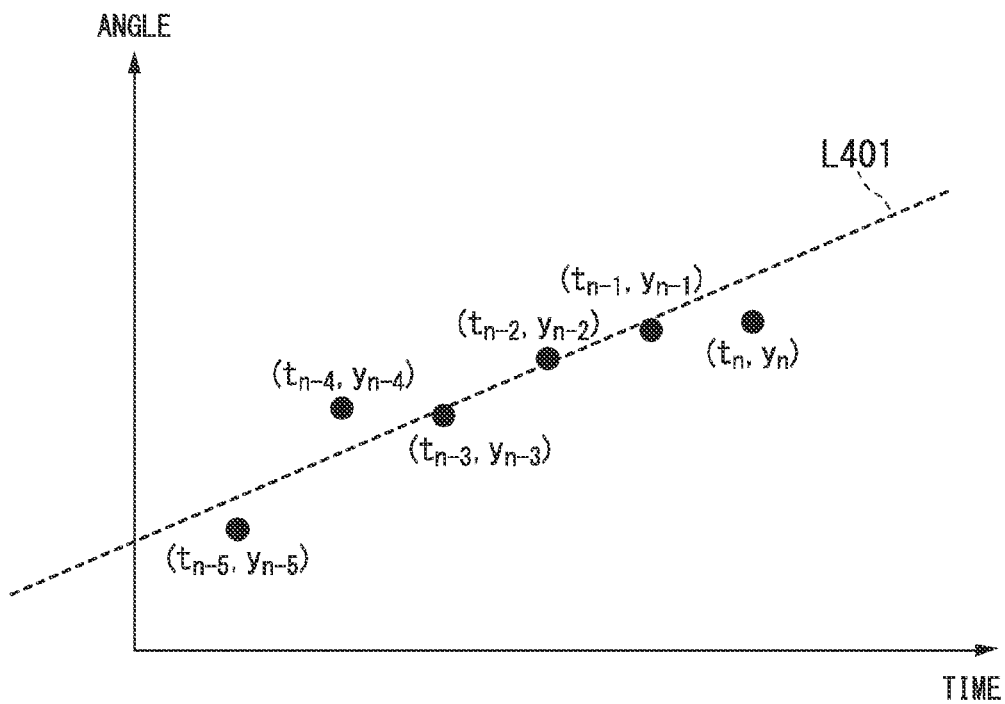
FIG. 10 is a graph showing an example of relationship between the measured-rotation angle value and time in the above-described embodiment.

FIG. 10 is a graph showing an example of relationship between the measured-rotation angle value and time. When the rotational acceleration is low, if the continuity-formed measured rotation angle values do not include the errors, the continuity-formed measured-rotation angle values locate on a straight-line as explained in FIG. 9. However, the continuity-formed measured-rotation angle values include errors in reality. Thus, as shown in FIG. 10, the continuity-formed measured-rotation angle values are located deviating from the line L401 not including the errors.

Therefore, the reference data acquisition unit 222 reduces the errors by performing straight-line approximation to the continuity-formed measured-rotation angle values. Particularly, in the case that the continuity-formed measured-rotation angle values deviate on the both sides of the line L401 not including the errors, reduction of errors is expected by performing the straight-line approximation.

The predominant errors included in the measured-rotation angle values are: the errors originated from the location that the resolver is attached on the motor; and the errors originated from the processing to the resolver-detected signal (the errors originated from the gains or the offsets to the sine wave signal (sine) and the cosine wave signal (cos θ) being different). Then, these errors recognized as the frequency components. Therefore, the continuity-formed measured-rotation angle values are deviated almost evenly on the both sides of the line without the errors. Thus, by performing the straight-line approximation to the continuity-formed measured-rotation angle values, the errors can be reduced significantly.

The reference data acquisition unit 222 performs the straight-line approximation using the least-square method. Specifically, the slope a of the line, y=at+b (y represents the measured-rotation angle value, and t represents time), is determined by the reference data acquisition unit 222 using the formula (3) below. The line, y=at+b, approximates the measured-rotation angle values $y_1, y_2, \ldots$, and $y_n$ by the least-square method.

$$a = \frac{n\sum_{i=1}^{n} t_i y_i - \sum_{i=1}^{n} t_i \sum_{i=1}^{n} y_i}{n\sum_{i=1}^{n} t_i^2 - \left(\sum_{i=1}^{n} t_i\right)^2}$$ [Formula 3]

The time $t_i$ is the time at which the i-th sampling is performed.

The intercept b of the above-mentioned line is also determined by the reference data acquisition unit 222 using the formula (4) below.

$$b = \frac{\sum_{i=1}^{n} t_i^2 \sum_{i=1}^{n} y_i - \sum_{i=1}^{n} t_i y_i \sum_{i=1}^{n} y_i}{n\sum_{i=1}^{n} t_i^2 - \left(\sum_{i=1}^{n} t_i\right)^2}$$ [Formula 4]

The slope a and the intercept b express the reference data of the rotation angle (the data expressed by the line, y=at+b) in which the errors included in each of the continuity-formed measured-rotation angle values are reduced. In other words, the reference data acquisition unit 222 acquires the reference data of the rotation angle in which the errors included in each of the continuity-formed measured-rotation angle values are reduced, as the expression form of the straight-line formula.

The reference data acquisition unit 222 outputs the obtained slope a and the intercept b to the subtraction unit 223.

The method for acquiring the reference data of the rotation angle with the reference data acquisition unit 222 is not limited to the method using the least-square method. For example, in regard to each time $t_i$, an average of the reference data of the rotation angle can be determined within a certain range centering in the time $t_i$ (for example, $t_{i-32}$ to $t_{i+32}$).

The subtraction unit 223 reads out the continuity-formed measured-rotation angle value from the storage unit 240 and calculates the errors included in the continuity-formed measured-rotation angle value y based on the slope a and the intercept b, which are output from the reference data acquisition unit 222. In other words, the subtraction unit 223 subtracts the value of the reference data of the rotation angle obtained by the reference data acquisition unit 222 from the each of the multiple measured-rotation angle values y obtained by the measured-rotation angle value acquisition unit 210.

FIG. 11 is a drawing showing an example of errors calculated by the subtraction unit 223.

In FIG. 11, $x_i$ represents the reference data of the rotation angle at the time $t_i$. The subtraction unit 223 calculates the reference data of the rotation angle, $x_1, x_2, \ldots$, and $x_n$, at the each times, $t_1, t_2, \ldots$, and $t_n$. Then, the errors, $e_1, e_2$, and are obtained by subtracting the each of the reference data of the rotation angle, $x_1, x_2, \ldots$, and $x_n$, from the continuity-formed measured-rotation angle values, $y_1, y_2, \ldots$, and $y_n$ with the subtraction unit 223.

The subtraction unit 223 outputs the obtained errors to the evenly spacing unit 231.

The frequency component acquisition unit 230 determines the phase and amplitude of the frequency component of the error from the multiple errors calculated by the subtraction unit 223. Particularly, the frequency component acquisition unit 230 determines the phase and amplitude of the errors in the fundamental and the second harmonic components from the multiple errors calculated by the subtraction unit 223.

The equally spacing unit 231 acquires the error in each of the multiple rotation angles set evenly spaced, based on the multiple errors calculated by the subtraction unit 223.

FIG. 12 is a drawing showing an example of errors acquired by the evenly spacing unit 231. In FIG. 12, the rotation angles, $X_1, X_2, \ldots$, and $X_N$, are set evenly spaced with the angle interval ΔX. The errors, $E_1, E_2, \ldots,$ and $E_N$, are the errors at the rotation angle data, $X_1, X_2, \ldots,$ and $X_N$, respectively.

The equally spacing unit 231 acquires the errors, $e_1, e_2, \ldots,$ and $e_3$, at each of the evenly-spaced multiple times, $t_1, t_2, \ldots,$ and $t_n$, from the subtraction unit 223. Then, the equally spacing unit 231 acquires the errors, $E_1, E_2, \ldots,$ and $E_N$, based on the errors, $e_1, e_2, \ldots,$ and $e_3$. In other words, the equally spacing unit 231 performs the processing in such way that the errors, which are evenly spaced in regard to the time, are evenly spaced in regard to the angle. For example, the equally spacing unit 231 performs interpolation (for example, the straight-line interpolation) to the errors, $e_1, e_2, \ldots,$ and $e_3$, to generate the errors, $E_1, E_2, \ldots,$ and $E_N$.

Alternatively, it may be configured in such a way that the equally spacing unit 231 acquires the errors, $E_1, E_2, \ldots,$ and $E_N$ by performing a selecting processing that extracts the evenly-spaced data in regard to the angle alone among the errors, $e_1, e_2, \ldots,$ and $e_3$.

For example, the equally spacing unit 231 writes the obtained errors, $E_1, E_2, \ldots,$ and $E_N$, to the storage unit 240 and outputs the signal indicating the completion of the processing to the Fourier series acquisition unit 232 to pass over the errors, $E_1, E_2, \ldots,$ and $E_N$ to the Fourier series acquisition unit 232.

The Fourier series acquisition unit 232 determines the Fourier series fitting to the errors, $E_1, E_2, \ldots,$ and $E_N$, at each of the multiple rotation angles set evenly spaced and acquired by the evenly-spacing unit 231 to determine the phase and amplitude of the frequency component of the errors (the errors included in the measured-rotation angle values y).

Specifically, the Fourier series acquisition unit 232 determines $A_1, B_1, A_2,$ and $B_2$, which are defined by the equation, $$E_i = A_1 \cdot \sin(X_i) + B_1 \cdot \cos(X_i) + A_2 \cdot \sin(2X_i) + B_2 \cdot \cos(2X_i)$$

in regard to: the rotation angles, $X_1, X_2, \ldots,$ and $X_N$; and the corresponding errors, $E_1, E_2, \ldots,$ and $E_N$, based on the Fourier series using the formula (5) below.

$$\left. \begin{aligned} A_1 &= \frac{2}{N} \sum_{i=1}^{N} E_i \cdot \sin(X_i) \\ B_1 &= \frac{2}{N} \sum_{i=1}^{N} E_i \cdot \cos(X_i) \\ A_2 &= \frac{2}{N} \sum_{i=1}^{N} E_i \cdot \sin(2X_i) \\ B_2 &= \frac{2}{N} \sum_{i=1}^{N} E_i \cdot \cos(2X_i) \end{aligned} \right\} \quad \text{[Formula 5]}$$

Then, the Fourier series acquisition unit 232 converts $A_1, B_1, A_2,$ and $B_2$ to the phases and amplitudes of the fundamental component and the second harmonic component based on the formula (6) below.

$$\left. \begin{aligned} \text{Fundamental Amplitude} &= \sqrt{A_1^2 + B_1^2} \\ \text{Fundamental Phase} &= a\text{Tan2}(A_1, B_1) \\ \text{Second Harmonic Amplitude} &= \sqrt{A_2^2 + B_2^2} \\ \text{Second Harmonic Phase} &= a\text{Tan2}(A_2, B_2) \end{aligned} \right\} \quad \text{[Formula 6]}$$

As described above, the predominant errors included in the measured-rotation angle values are: the errors originated from the location that the resolver is attached on the motor; and the errors originated from the processing to the resolver-detected signal. The errors originated from the location that the resolver is attached on the motor emerge as the fundamental component. The errors originated from the processing to the resolver-detected signal emerge as the second harmonic component. That is, in regard to the errors included in the measured-rotation angle values, the fundamental component and the second harmonic component are predominant.

Figure 13:
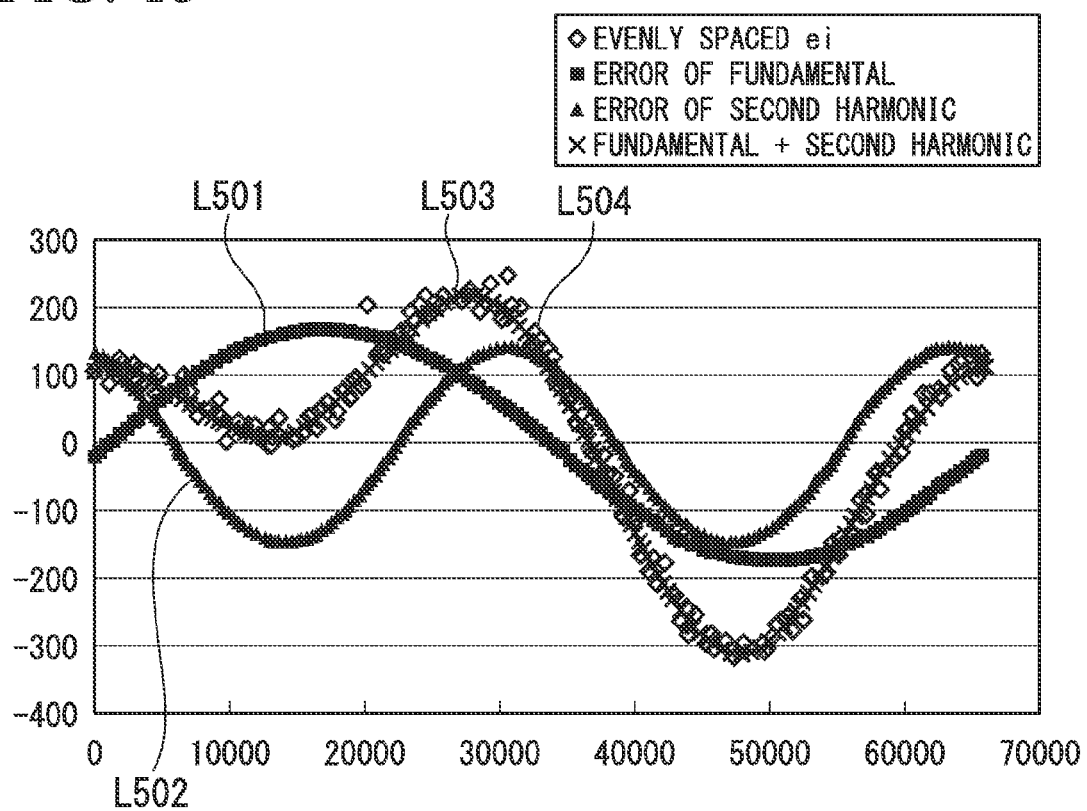
FIG. 13 is a graph showing the relationships among the errors included in the measured-rotation angle values, the fundamental components in the errors, and the second harmonic components in the errors in the above-described embodiment.

FIG. 13 is a graph showing the relationships among the errors included in the measured-rotation angle values, the fundamental components in the errors, and the second harmonic components. In FIG. 13, the line L501 indicates the fundamental components of the errors, and the line L502 indicates the second harmonic components of the errors. The line L503 indicates the values in which the fundamental and second harmonic components are combined.

The line L504 indicates the errors included in the measured-rotation angle values (the errors in each of multiple rotation angles set evenly spaced acquired by the evenly spacing unit 231).

In FIG. 13, the lines L503 and L504 are almost overlapped. Therefore, the fundamental component and the second harmonic component are predominant in the errors included in the measured-rotation angle values. In other words, the errors included in measured-rotation angle values can be mostly reconstructed by the fundamental component and the second harmonic component.

The Fourier series acquisition unit 232 determines the phase and amplitude of each of the fundamental and second harmonic components in the frequency components of the errors included in the measured-rotation angle values. By limiting the frequency components of which the Fourier series acquisition unit 232 determines the phase and amplitude as explained above, the load on the Fourier series acquisition unit 232 can be suppressed.

However, the frequency components of which the Fourier series acquisition unit 232 determines the phase and amplitude are not limited to the fundamental and the second harmonic components. It may be configured in such a way that the Fourier series acquisition unit 232 determines the phase and amplitude in the third harmonic component or higher. Alternatively, it may be configured in such a way that the Fourier series acquisition unit 232 determines the phase and amplitude in the fundamental component alone.

The Fourier series acquisition unit 232 outputs the obtained phases and amplitudes of the fundamental and second harmonic components to the angle correction unit 122 (see FIG. 1).

The angle correction unit 122 acquired the phases and amplitudes of the fundamental and second harmonic components included in the measured-rotation angle values performs correction to reduce the errors included in the measured-rotation angle values, which are output from the measured-rotation angle value acquisition unit 210, based on these phases and amplitudes.

Figure 14:
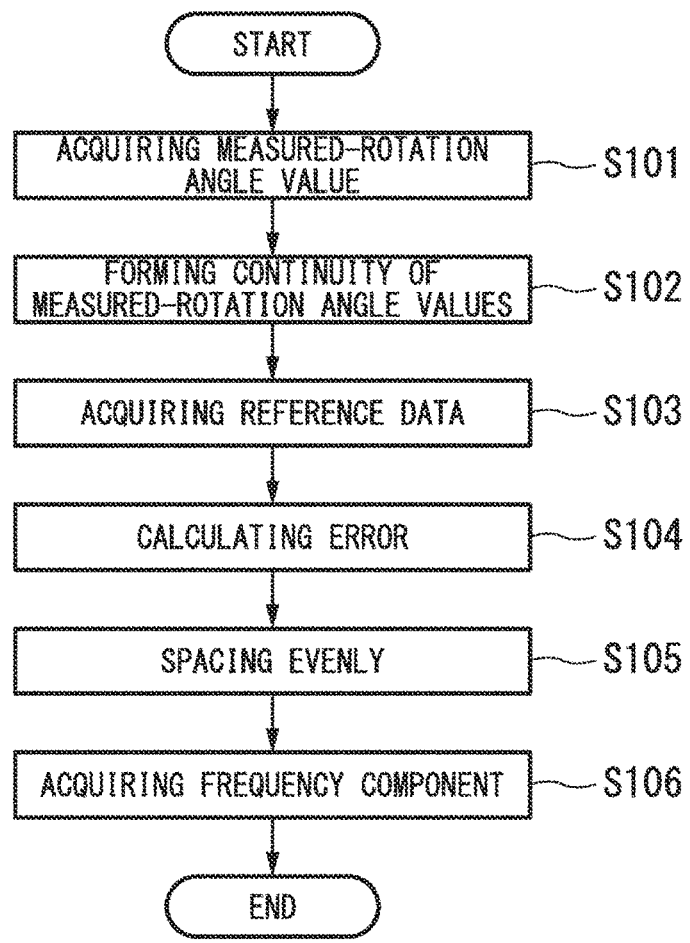
FIG. 14 is a flowchart showing the procedure for acquiring the phase and amplitude of the frequency components included in the measure-rotation angle values with the error frequency component acquisition device 121 in the above-described embodiment.
Figure 15:
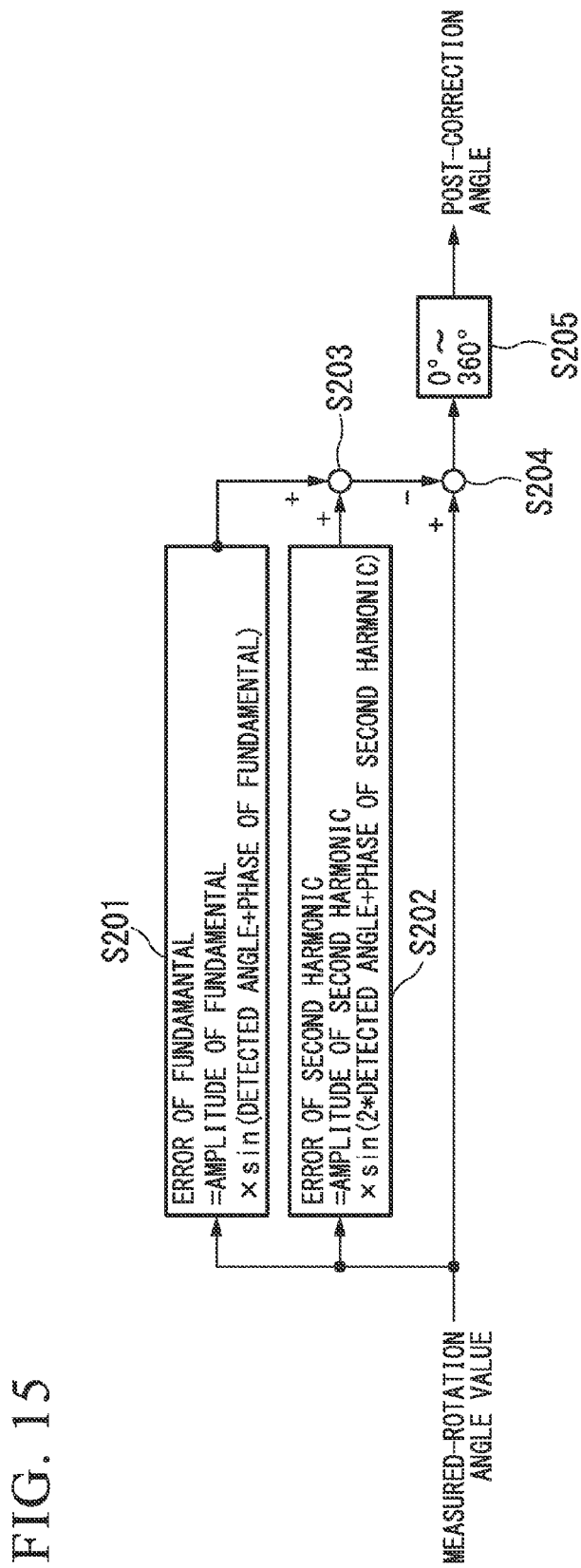
FIG. 15 is an explanatory diagram showing the procedure for performing correction with the angle correction unit 122 in the above-described embodiment.

Next, the operation of the motor control device 110 is explained in reference to FIGS. 14 and 15.

FIG. 14 is a flowchart showing the procedure for acquiring the phase and amplitude of the frequency components included in the measure-rotation angle values with the error frequency component acquisition device 121.

In the procedure shown in FIG. 14, the measured-rotation angle value acquisition unit 210 converts the resolver-detected signal, which is output from the resolver 110, to the measure-rotation angle value y. Then, the measured-rotation angle value acquisition unit 210 outputs the obtained measured-rotation angle value y to the error calculation unit 220 (the continuity-forming unit 221) and the angle correction unit 122 in order (Step S101).

Next, the continuity-forming unit 221 forms continuity in the switching point of the rotation angle in the multiple measured-rotation angle values y, which are output from the measured-rotation angle value acquisition unit 210. Then, the continuity-forming unit 221 converts the multiple measured-rotation angle values y to the continuity-formed measured-rotation angle value to pass it over to the reference data acquisition unit 222 (Step S102).

Next, the reference data acquisition unit 222 acquires the reference data of the rotation angle, which is generated by the continuity-forming unit 221 and the errors included in each of the continuity-formed measured-rotation angle values are reduced in, and outputs it to the subtraction unit 223 (Step S103).

Then, the subtraction unit 223 calculates the errors included in the continuity-formed measured-rotation angle value based on the reference data of the rotation angle, which is output from the reference data acquisition unit 222, and outputs the obtained errors to the evenly spacing unit 231 (Step S104).

Next, the evenly spacing unit 231 acquires the errors in each of multiple rotation angles set evenly spaced based on the multiple errors calculated by the subtraction unit 223, and passes it over to the Fourier series acquisition unit 232 (Step S105).

Then, the Fourier series acquisition unit 232 determines the Fourier series fitting to the errors in the each of the multiple rotation angles set evenly spaced acquired by the evenly spacing unit 231. Then, the Fourier series acquisition unit 232 determines the phase and amplitude of the frequency components of the errors and outputs the obtained phase and amplitude to the angle correction unit 122 (see FIG. 1) (Step S106).

After that, the procedure in FIG. 14 ends.

In regard to the timing that the error frequency component acquisition device 121 requests the phase and amplitude of the frequency component of the error, several cases can be envisioned. For example, it may be configured in such a way that the error frequency component acquisition device 121 automatically requests the phase and amplitude when the state in which the speed variation of the motor M is at a predetermined threshold value or less has continued for an hour or longer (in the case where a necessary number of the sampling data to determine the phase and amplitude is obtained). Such a state would occur when an electric vehicle or the like, on which the motor control device 100 is mounted, is running at a constant torque in a state where the error frequency component acquisition device 121 has not acquired the phase and amplitude of the frequency component of the errors.

Alternatively, it may be configured in such a way that the operator of the motor control device 100 instructs the error frequency component acquisition device 121 to request the phase and amplitude of the frequency component of the error while allowing the motor M rotating at a constant speed.

On the other hand, the error frequency component acquisition device 121 generates the measured-rotation angle values y continuously during the motor M running, and outputs them.

FIG. 15 is an explanatory diagram showing the procedure for performing correction with the angle correction unit 122. The angle correction unit 122 starts the procedure in FIG. 15 for every acquisition of the measured-rotation angle values, which are output from the measured-rotation angle value acquisition unit 210, when the angle correction unit 122 is in a state where the phases and amplitudes of the fundamental and second harmonic components have been acquired in advance.

In the procedure shown in FIG. 15, the angle correction unit 122 calculates the value for the fundamental component based on the phase and amplitude of the fundamental component, and the measured-rotation angle value (Step S201).

Also, the angle correction unit 122 calculates the value for the second harmonic component based on the phase and amplitude of the second harmonic component, and the measured-rotation angle value (Step S202).

Then, the angle correction unit 122 calculates the value of the errors included in the measured-rotation angle values by combining the value of the fundamental component and the value of the second harmonic component (Step S203).

Next, the angle correction unit 122 reduces the errors included in the measured-rotation angle values by subtracting the values of the errors calculated in Step S203 from the measured-rotation angle values (Step S204).

Then, the angle correction unit 122 performs a conversion from the rotation angle calculated in Step S204 to a value equals to 0° or more and less than 360° (dividing to calculate remainder), and outputs the obtained rotation angle as the post-correction rotation angle θ' (Step S205).

After that, the procedure to the measured-rotation angle value in FIG. 15 ends.

As explained above, the measured-rotation angle value acquisition unit 210 acquires the measured-rotation angle value of the motor shaft, and the error calculation unit 220 calculates the errors included in each of the multiple measured-rotation angle values. Then, the frequency component acquisition unit 230 determines the phases and amplitudes of the frequency components of the errors based on the multiple errors.

Because of this, the error frequency component acquisition device 121 can calculate the phases and amplitudes of the frequency components of the errors included in the measured-rotation angle values automatically. Also, the angle correction unit 122 can perform correction relative to the measured-rotation angle values using the phases and amplitudes. Thus, it is possible to obtain the rotation angle of the rotor with less error while reducing burden of the operator.

Also, the evenly spacing unit 231 acquires the errors in each of the multiple rotation angles set evenly spaced based on the multiple errors calculated by the subtraction unit 223. Then, the Fourier series acquisition unit 232 determines the Fourier series fitting to the errors in the each of the multiple rotation angles set evenly spaced.

Because of this, the Fourier series acquisition unit 232 can determine the phases and amplitudes of the frequency components of the errors more accurately. Also, the angle correction unit 122 can further reduce the errors included in the measured-rotation angle values.

Also, the frequency component acquisition unit 230 determines the phases and amplitudes of the fundamental and second harmonic components of the errors.

As explained above, in the errors included in the measured-rotation angle values, the fundamental component and the second harmonic component are predominant. Therefore, the rotation angle acquisition device 120 can obtain the rotation angle with less error while the load on the frequency component acquisition unit 230 is suppressed.

Also, the continuity-forming unit 221 forms continuity in the switching point of the rotation angle in the multiple measured-rotation angle values, and the reference data acquisition unit 222 acquires the reference data of the rotation angle in which the errors included in each of the continuity-formed measured-rotation angle values are reduced.

Because of this, the reference data acquisition unit 222 can perform the straight-line approximation to the sampling data (measured-rotation angle values) of the longer section and can acquire the more accurate reference data of the rotation angle.

Processing in each part may be performed by: storing the program for attaining all or a part of the function of the error frequency component acquisition device 121 in the recording medium readable by a computer; allowing a computer system reading the program stored in the recording medium; and executing the program. The above-mentioned "computer system" includes hardware such as peripheral devices or the like.

Also, when the above-mentioned "computer system" utilizes the WWW system, it includes the environment for providing a homepage (or a display environment).

Also, the above-mentioned "recording medium readable by a computer" means a transportable medium, such as the flexible disk, the magnetic optical disc, ROM, and the like, or a storage device such as the hard disk and the like built-in the computer system. Also, the above-mentioned "recoding medium readable by a computer" includes: what retains the program dynamically in a short period of time such as the network of the internet or the like and the communication line in the case of transmitting the program via the telephone communication line or the like; and what retains the program for a certain period of time such as the volatile memory in the computer system of the server or the client in the above-mentioned case. Also, the above-mentioned program may be for attaining a part of above-mentioned function. Furthermore, the above-mentioned function may be attained by combining the program and a program that has been stored in the computer system already.

The embodiments of the present invention are explained above in reference to the drawings. However, the specific configuration is not limited by the descriptions of the present embodiments, and includes modification or the like within the scope of the present invention.

The rotation angle of the rotor with less error can be obtained, while reducing the burden of the operator.

BRIEF DESCRIPTION OF REFERENCE SYMBOLS

100: Motor control device
110: Resolver
120: Rotation angle acquisition device
121: Error frequency component acquisition device
122: Angle correction unit
130: Speed calculation unit
141: Current detector
142: 3-phase/2-phase conversion unit
151: Current commanding unit
152: Current PI controller
153: 2-phase/3-phase conversion unit
154: Duty calculator 154
155: Electrical power conversion unit
210: Measured-rotation angle value acquisition unit
220: Error calculation unit
222: Reference data acquisition unit
223: Subtraction unit
230: Frequency component acquisition unit
231: Evenly spacing unit
232: Fourier series acquisition unit
240: Storage unit

The invention claimed is:

1. An error frequency component acquisition device comprising: a measured angle value acquisition unit configured to acquire a plurality of measured-rotation angle values of a motor shaft; an error calculation unit configured to calculate an error included in each of the plurality of measured-rotation angle values acquired by the measured angle value acquisition unit; and a frequency component acquisition unit configured to determine a phase and an amplitude of a frequency component of the error based on a plurality of errors calculated by the error calculation unit, wherein the frequency component acquisition unit comprises: an evenly spacing unit configured to acquire an error of each of the plurality of rotation angles set up in an equal spacing based on the plurality of errors calculated by the error calculation unit; and a Fourier series acquisition unit configured to determine the phase and the amplitude of the frequency component of the error by acquiring a Fourier series fitting to the error of the each of a plurality of rotation angles set up in an equal spacing obtained by the evenly spacing unit;

wherein the error calculation unit comprises: a continuity-forming unit configured to form continuity at a switching point of the rotation angles of a plurality of the measured-rotation angle values acquired by the measured angle value acquisition unit to convert the plurality of the measured-rotation angle values to continuity-formed measured-rotation angle values; a reference data acquisition unit configured to acquire a rotation-angle reference data, in which the error included in the each of the plurality of the continuity-formed measured-rotation angle values generated by the continuity-forming unit is reduced; and a subtraction unit configured to subtract the rotation-angle reference data acquired by the reference data acquisition unit from the each of the plurality of the measured-rotation angle values acquired by the measured angle value acquisition unit; wherein, in a case where a first measured value, which is a latter measured rotation angle of two continuously measured rotation angles, is lower than a second measured value, which is a former measured angle of the two continuously measured rotation angle, at an extent equal to a predetermined rotation angle or more, the plurality of the measured-rotation angle values are converted to the continuity-formed measured-rotation angle values by forming continuity at the switching point of the rotation angles of the plurality of the measured-rotation angle values: by subtracting 360° from each of the plurality of the measured angle values measured before the second measured value; or by adding 360° to each of the plurality of the measured angle values measured after the first measured value, and in a case where the first measured value is higher than the second measured value at an extent equal to a predetermined rotation angle or more, the plurality of the measured-rotation angle values are converted to the continuity-formed measured-rotation angle values by forming continuity at the switching point of the rotation angles of the plurality of the measured-rotation angle values: by adding 360° to each of the plurality of the measured angle values measured before the second measured value; or by subtracting 360° from each of the plurality of the measured angle values measured after the first measured value.

2. The error frequency component acquisition device according to claim 1, wherein the frequency component acquisition unit determines the phase and amplitude of a fundamental component of the error and a second harmonic component of the error based on a plurality of the errors calculated by the error calculation unit.

3. A rotation angle acquisition device comprising:
the error frequency component acquisition device according to claim 1; and
a rotation angle correction unit configured to perform correction to reduce an error with respect to the measured-rotation angle value of the motor shaft based on the phase and the amplitude of the frequency component of the error acquired by the error frequency component acquisition device.

4. A motor control device comprising the rotation angle acquisition device according to claim 3.

5. A rotation angle acquisition method comprising the steps of: acquiring a plurality of measured-rotation angle values; calculating an error included in each of a plurality of measured-rotation angle values acquired in the step of acquiring the plurality of measured-rotation angle values; acquiring a phase and an amplitude of a frequency component of the error based on a plurality of errors calculated in the step of calculating an error; and performing correction to reduce an error with respect to the measured-rotation angle value of the motor shaft based on the phase and the amplitude of the frequency component of the error acquired in the step of acquiring a phase and an amplitude of a frequency component wherein the acquiring of the phase and the amplitude of the frequency component comprises: acquiring an error of each of a plurality of rotation angles set up in an equal spacing based on the plurality of errors calculated; and determining the phase and the amplitude of the frequency component of the error by acquiring a Fourier series fitting to the error of the each of a plurality of rotation angles set up in an equal spacing obtained; wherein the error calculation unit comprises: a continuity-forming unit configured to form continuity at a switching point of the rotation angles of a plurality of the measured-rotation angle values acquired by the measured angle value acquisition unit to convert the plurality of the measured-rotation angle values to continuity-formed measured-rotation angle values; a reference data acquisition unit configured to acquire a rotation-angle reference data, in which the error included in the each of the plurality of the continuity-formed measured-rotation angle values generated by the continuity-forming unit is reduced; and a subtraction unit configured to subtract the rotation-angle reference data acquired by the reference data acquisition unit from the each of the plurality of the measured-rotation angle values acquired by the measured angle value acquisition unit; wherein, in a case where a first measured value, which is a latter measured rotation angle of two continuously measured rotation angles, is lower than a second measured value, which is a former measured angle of the two continuously measured rotation angle, at an extent equal to a predetermined rotation angle or more, the plurality of the measured-rotation angle values are converted to the continuity-formed measured-rotation angle values by forming continuity at the switching point of the rotation angles of the plurality of the measured-rotation angle values: by subtracting 360° from each of the plurality of the measured angle values measured before the second measured value; or by adding 360° to each of the plurality of the measured angle values measured after the first measured value, and in a case where the first measured value is higher than the second measured value at an extent equal to a predetermined rotation angle or more, the plurality of the measured-rotation angle values are converted to the continuity-formed measured-rotation angle values by forming continuity at the switching point of the rotation angles of the plurality of the measured-rotation angle values: by adding 360° to each of the plurality of the measured angle values measured before the second measured value; or by subtracting 360° from each of the plurality of the measured angle values measured after the first measured value.

* * * * *